US010962941B2

(12) United States Patent
Carlson (10) Patent No.: US 10,962,941 B2
(45) Date of Patent: Mar. 30, 2021

(54) CONTROLLING A DISTRIBUTED GENERATION MANAGEMENT SYSTEM

(71) Applicant: SolarCity Corporation, San Mateo, CA (US)

(72) Inventor: Eric Daniel Carlson, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 94 days.

(21) Appl. No.: 14/960,231

(22) Filed: Dec. 4, 2015

(65) Prior Publication Data

US 2016/0344188 A1  Nov. 24, 2016

Related U.S. Application Data

(60) Provisional application No. 62/163,200, filed on May 18, 2015.

(51) Int. Cl.
| | | |
|---|---|---|
| *G05B 15/02* | (2006.01) | |
| *H02J 3/32* | (2006.01) | |
| *H02J 3/38* | (2006.01) | |
| *H02J 13/00* | (2006.01) | |

(52) U.S. Cl.
CPC ............. *G05B 15/02* (2013.01); *H02J 3/32* (2013.01); *H02J 3/383* (2013.01); *H02J 13/0006* (2013.01); *H02J 13/0062* (2013.01); *H02J 13/0075* (2013.01); *Y02B 10/10* (2013.01); *Y02B 10/30* (2013.01); *Y02E 10/56* (2013.01); *Y02E 40/70* (2013.01); *Y02E 70/30* (2013.01); *Y04S 10/123* (2013.01)

(58) Field of Classification Search
None
See application file for complete search history.

(56) References Cited

U.S. PATENT DOCUMENTS 6,925,385 B2 * 8/2005 Ghosh .................. F03D 7/0284
  702/1
8,509,953 B2 * 8/2013 Taft ........................ G01D 4/002
  700/286

OTHER PUBLICATIONS

Bai et al., "Design of Wireless Sensor Netwok in SCADA System for Wind Power Plant", IEEE 2008.*
Liang et al., "Decentralized Economic Dispatch in Microgrids via Heterogeneous Wireless Networks", 2012 IEEE (Year: 2012).*
Abdelrazek, Sherif et al., "Integrated Control of Battery Energy Storage Management System Considering PV Capacity Firming and Energy Time Shift Applications", IEEE 2014. (Year: 2014).*

* cited by examiner

*Primary Examiner* — Carlos R Ortiz Rodriguez
(74) *Attorney, Agent, or Firm* — Dentons US LLP (57) ABSTRACT

Techniques for controlling a distributed generation management system may be provided. Real-time power generation information may be collected from sensors of energy generation systems that make up a grid of controlled systems. An aggregate real-time power generation requirement may be determined for the grid based on the real-time power generation information. Using the aggregate requirements, a power profile may be calculated for the grid that indicates a level of power generation for the grid. In some examples, a control signal to control power generation may be generated and provided to the controlled systems.

20 Claims, 6 Drawing Sheets

CONTROLLING A DISTRIBUTED GENERATION MANAGEMENT SYSTEM

CROSS-REFERENCES TO RELATED APPLICATIONS

This application claims the benefit of and priority to U.S. Provisional Application No. 62/163,200, filed May 18, 2015, the entire contents of which is incorporated herein by reference for all purposes. Additionally, this application is related to co-pending U.S. patent application Ser. No. 14/794,389, filed on Jul. 8, 2015, entitled "UTILITY PROVISIONING IN AN ENERGY RESOURCE SYSTEM", co-pending U.S. patent application Ser. No. 14/741,327, filed on Jun. 16, 2015, entitled "DYNAMIC CURTAILMENT OF AN ENERGY GENERATION SYSTEM", co-pending U.S. patent application Ser. No. 14/697,353, filed on Apr. 27, 2015, entitled "FAILSAFE POWER PROFILE FOR A DISTRIBUTED GENERATION MANAGEMENT SYSTEM", co-pending U.S. patent application Ser. No. 14/743,727, filed on Jun. 18, 2015, entitled "DETERMINING A LOAD METER INSTALLATION LOCATION IN AN ENERGY GENERATION SYSTEM", co-pending U.S. patent application Ser. No. 14/802,811, filed on Jul. 17, 2015, entitled "SCALABLE HIERARCHICAL ENERGY DISTRIBUTION GRID UTILIZING HOMOGENEOUS CONTROL LOGIC", co-pending U.S. patent application Ser. No. 14/746,463, filed on Jun. 22, 2015, entitled "SYSTEMS AND METHODS OF HOME EFFICIENCY MODELING", co-pending U.S. patent application Ser. No. 14/802,581, filed on Jul. 17, 2015, entitled "IMPROVEMENTS TO PEAK SHAVING USING ENERGY STORAGE", U.S. Provisional Application No. 62/155,444, filed on Apr. 30, 2015, entitled "CHARGING PROFILES FOR A STORAGE DEVICE IN AN ENERGY GENERATION SYSTEM", co-pending U.S. patent application Ser. No. 14/933,813, filed on Nov. 5, 2015, entitled "DETERMINING AN ORIENTATION OF A METERING DEVICE IN AN ENERGY GENERATION SYSTEM", co-pending U.S. patent application Ser. No. 14/921,142, filed on Oct. 23, 2015, entitled "REAL-TIME ENERGY DATA PUBLISHING SYSTEMS AND METHODS", and co-pending U.S. patent application Ser. No. 14/527,553, filed Oct. 29, 2014, entitled "POWER MANAGEMENT MESSAGE BUS SYSTEM", the entire contents of each being incorporated herein by reference for all purposes.

BACKGROUND

In recent years, climate awareness and the cost of energy has increased to the point that many consumers have begun to install renewable energy generation systems at both residential and non-residential locations. Solar photovoltaic (PV) systems, for example, have become relatively popular. Often, the PV systems will be "grid-tied," in that it is connected to the utility-maintained electrical system (i.e., "the greater grid"). In many ways, this can be a benefit to the greater grid and/or the consumer. However, this can also pose technological and/or safety challenges, for example when the output of the PV systems becomes greater than that desired by the greater grid.

BRIEF SUMMARY

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to one embodiment, a method for controlling a plurality of energy generation systems may be executed by a server computer. In some examples, the method may include detecting the plurality of energy generation systems over a wireless network, where the plurality of energy generation systems form a grid network. Additionally, the method may include requesting sensor data from the plurality of energy generation systems of the grid network, where the sensor data includes real-time power generation data. In some aspects, the method may include receiving the sensor data from at least a subset of the plurality of energy generation systems and determining real-time power generation requirements for at least the subset of the plurality of energy generation systems based at least in part on the sensor data. Additionally, the method may include determining an aggregate real-time power generation requirement for the grid network based at least in part on the real-time power generation requirements for at least the subset of the plurality of energy generation systems.

The method may also include calculating a power profile for the grid network based at least in part on the aggregate real-time power generation requirement. In some examples, the method may also include generating a control signal to control power generation for one or more of the plurality of energy generation systems of the grid network and transmitting the control signal to the one or more energy generation systems. The control signal may correspond to the power profile. In some aspects, the power profile may be calculated to reconcile the aggregate real-time power generation requirement for the grid network. Additionally, the wireless network may comprise a message bus system configured to communicate at least one of the sensor data or the control signal. In some examples, the control signal may be configured to instruct a power generation asset of the one or more energy generation systems. Further, the sensor data may include asset data that identifies one or more assets of the grid network, the one or more assets of the grid network may be configured to manage real-time power generation of at least one of the plurality of energy generation systems, and the control signal may be configured to control the one or more assets of the grid network.

According to another embodiment, a system may include a server computer with a processor configured to execute computer-executable instructions, stored in a memory of the server computer to identify a plurality of energy generation systems over a network, where the plurality of energy generation systems form a grid network. In some aspects, the system may also receive power data from a sensor of at least a subset of the plurality of energy generation systems of the grid network. The system may also be configured to determine an aggregate real-time power requirement for the grid network based at least in part on the power data. In some examples, the system may calculate a power profile for the grid network based at least in part on the aggregate real-time power generation requirement. Additionally, the system may be configured to generate a control signal to control power generation for one or more of the plurality of energy generation systems of the grid network and transmit the control signal to the one or more energy generation systems.

In some examples, the system may also request the power data from the sensor at least in response to identifying the plurality of energy generation systems. The network may comprise at least one of a wireless network, a wired network, or a power line network. The power data received from the sensor may comprise real-time power generation data and the system may also determine real-time power generation requirements for at least the subset of the plurality of energy generation systems based at least in part on real-time power generation data. In some examples, the system may request asset data from the plurality of energy generation systems, wherein the asset data identifies one or more assets in the plurality of energy generation systems and receive the asset data from the plurality of energy generation systems, wherein the control signal is configured to control the one or more assets in the plurality of energy generation systems. In some examples, the one or more assets may be configured to control real-time power generation of the plurality of energy generation systems or at least one of the one or more assets may comprise a photovoltaic inverter. In some cases, the sensor data may be received from a gateway device that collects the sensor data from at least the subset of the plurality of energy generation systems. Additionally, the gateway device may be configured to receive the sensor data via the wireless network or the gateway device may be configured to receive the sensor data from at least one of a meter coupled to an asset of one energy generation system of the subset of the plurality of energy generation systems, the one energy generation system of the subset of the plurality of energy generation systems, a set of energy generation systems of the subset of the plurality of energy generation systems, or a secondary gateway.

In another embodiment, a computer-readable storage medium may be configured to store computer-readable instructions that, when executed by one or more processors, configure the one or more processors to perform operations. In some examples, the operations may include identifying a plurality of energy generation systems over a network, where the plurality of energy generation systems forms a grid network. The operations may also include receiving sensor data from at least a subset of the plurality of energy generation systems, where the sensor data includes real-time power generation data. Some operations may include determining real-time power generation requirements for at least the subset of the plurality of energy generation systems based at least in part on the sensor data. Additionally, in some cases, the operations may include determining an aggregate real-time power generation requirement for the grid network based at least in part on the real-time power generation requirements for at least the subset of the plurality of energy generation systems. The operations may also include calculating a power profile for the grid network based at least in part on the aggregate real-time power generation requirement and/or providing, to the one or more energy generation systems, a control signal to control power generation for one or more of the plurality of energy generation systems of the grid network based at least in part on the power profile. In some aspects, the power profile may be calculated to ensure maintenance of the aggregated real-time power generation requirement for the grid network. The sensor data may be received via a message bus system. Further, in some cases, the sensor data may include asset data that identifies one or more assets of the grid network, the one or more assets of the grid network may be configured to manage real-time power generation of at least one of the plurality of energy generation systems, and the control signal may be configured to control the one or more assets of the grid network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples of the present disclosure are directed to, among other things, controlling a distributed power generation management system. In particular, a distributed power generation management system may include one more distributed power generation nodes or elements (e.g., a PV circuit), interconnected to form a grid framework, within a segment or location. For example, a segment may include a single site (e.g., a residential or commercial location with one or more nodes), a group of sites, a neighborhood, a compound, a group of neighborhoods serviced by a single utility substation, or the like. In any event, the present disclosure may be directed to the real-time management (e.g., control) of each distributed power generation node within the segment such that particular electrical properties may be maintained for the entire segment. In other words, the present disclosure may enable maintenance of a net behavior across an entire segment of a grid or of the entire grid itself.

More specifically, a segment may include one or more separate residential sites (e.g., homes, apartment buildings, etc.) each with separate power generation nodes (e.g., a PV system, a "grid-tied" battery, a hydroelectric power generation system, a wind turbine, a gas or diesel generator, or the like) and one or more power loads (e.g., devices, appliances, or other systems that utilize power to operate). Alternatively, or in addition, the segment may include a single site with two or more separate power generation nodes and/or some loads. In any event, the current example will be described with reference to a segment that includes at least two nodes; however any number of nodes (e.g., more or less than two) may be included in the grid segment. In some cases, an individual customer's needs may be balanced with the needs/requirements of the greater grid and/or the lesser grid.

The grid segment may be electrically tied to a greater grid (e.g., a utility-managed utility service), and each node may be able to communicate with a service provider capable of implementing the features described herein. The PV circuit can be coupled to the main panel (e.g., greater grid) to power the site load. Additionally, the PV circuit can be "grid connected" such that any over-generation (e.g., PV generation that is greater than the immediate load requirement) can be fed back to the utility through the on-site main panel. This may result in a credit on the site owner's electricity bill and allow the benefits of this energy to be conveyed to others on the grid. In some cases, a server computer system may be configured to collect real-time power generation information for each node within the segment (e.g., the power output of each node may be collected). The server computer system may also be configured to collect aggregate power generation information for the entire segment (in this case, the total loads, the total amount of power generated by the nodes, and/or the total amount of power being supplied by the greater grid). Thus, the service provider may determine, based at least in part on the collected information, how much power each node should be generating in order to maintain the desired net behavior across the segment.

In some examples, once the service provider (e.g., utilizing the server computer system) determines how much power each node should be generating, the service provider may instruct each node on how much power to generate at least for a time period. In some examples, each node may be an individual PV system of a customer. For example, the determination may be in real-time, using real-time data, and thus the amount of power each node should be generating may only be accurate until the next calculation is made. As such, the instructions provided to each node may include an amount of time for which to maintain or curtail a particular level of power generation. In some cases, the service provider may be providing new instructions to one or more nodes (e.g., to the PV system of the customer, or to multiple PV systems within the neighborhood) every few seconds, or minutes, in order to maintain the desired net behavior of the grid segment. The instructions may be provided in the form of a control signal that instructs the node on how much power to generate.

As noted, the service provider (e.g., utilizing a server computer or the like) may be making the determinations based on the collected information of the segment. This may be beneficial because each node may not be aware of the other power generation systems within the segment, the other loads within the segment, the level of granularity of the segment, and/or the greater grid requirements. In this way, the distributed system with a service provider controlling the nodes provide enhancements and enables the management of multiple different segments, overlapping segments, subsets of segments, and/or entire greater grids without reprogramming each node or re-equipping each site. In some examples, the distributed system may be configured with one more sensors, meters, and/or gateway devices for communicating the power generation information to and from the service provider and the individual power generation nodes. The service provider may be configured to reconcile utility grid requirements from the perspective of the customer (e.g., ensuring that the grid requirements are met by changing individual customer settings) and/or the perspective of the lesser grid (e.g., ensuring that the grid requirements are met by changing lesser grid settings).

While examples are given with specific numbers or types of example power generation nodes, any number or type of power generation system, load may be utilized without departing from the embodiments described herein. For example, a single PV system within a customer's home (or a few PV systems within a neighborhood) may be the entirety of the lesser grid being controlled. Further, while the service provider may be described as using a cloud-based or other type of server computing device, it should be understood that any computing system (including a handheld device), or combination of computing devices, may be used to collect the power generation information, determine relative amounts of power to be generated by each node, and provide appropriate control signals.

Figure 1:
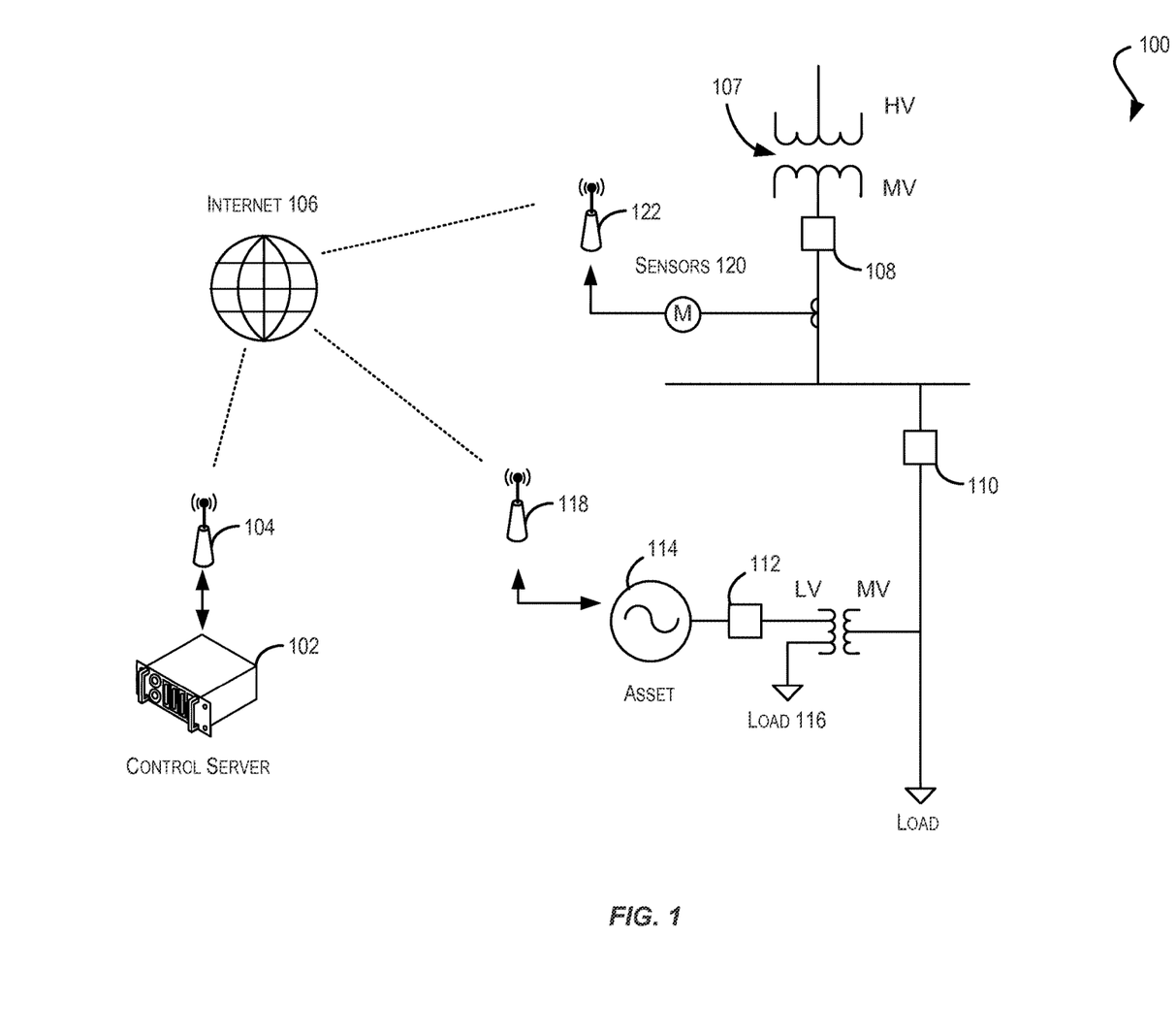
FIG. 1 is a simplified block diagram illustrating an example architecture and environment for controlling a distributed generation management system as described herein, according to at least one example.

FIG. 1 illustrates example environment 100 for implementing features of the present disclosure. In example environment 100, control server 102 (e.g., of a distributed generation management system service provider), having one or more network interfaces 104 (e.g., a wireless antenna or other wired interface), may be configured to access a wide area network (WAN) such as, but not limited to the Internet or any other network 106. In other examples, the network may be private and/or control server 102 may be accessible via an Internet Protocol (IP) address without having general Internet access. Example environment 100 also includes a transformer 107 or other high-voltage to lower-voltage conversion device capable of stepping down utility-managed power (e.g., from a greater grid or utility service provider) to be provided to one or more components of a segment of components (e.g., particular power generation devices within a location, a set of power generation devices, a neighborhood, etc.). In one example, node 108 represents a connection between the greater grid and a particular segment of a grid of components (lesser grid). Additionally, node 110 may represent a connection at a particular site (e.g., a residence or the like) within the segment. Not all locations within the segment (e.g., other sites connected to node 110) will necessarily include power generation devices (or nodes). This example, only shows one site connected to node 110; however, other sites could conceivably be part of the lesser grid, as desired.

In some cases, a circuit breaker or other voltage step-down device may lower the voltage received at node 110 to a manageable voltage for regular appliances or the like. For example, the voltage drop at node 110 may be roughly 220V-240V, while the voltage drop at node 112 may be closer to 110V-120V. In any event, node 112 may represent a connection to an asset (power generation device) 114. For example, asset 114 may be a PV power generation device that can provide power to load 116 (e.g., a hot water heater, a lamp, etc.) of the site at node 112 and/or back to the lesser grid at node 110 and/or the greater grid at node 108. Further, asset 114 may be connected to or otherwise configured with network interface (here, a wireless antenna) 118 for accessing the Internet 106 and/or control server 102 via the IP address of control server 102. Similarly, node 108 may be configured with sensor 120 (for collecting input and/or output power information at node 108) that is connected to network interface (wireless antenna) 122. Network interface 122 may be able to relay the power information collected by sensors 120 to control server 102 via network 106. In this way, control server 102 may be able to receive aggregate power information about the segment (lesser grid) from interface 122, receive specific asset 114 power generation information from interface 118, determine an appropriate level of power generation for asset 114, and provide a control signal from interface 104 to interface 118 to instruct asset 114 regarding how much power to generate. Thus, control server 102 is capable of managing the aggregate power of the segment (lesser grid) in real-time by providing real-time instructions to asset 114 at the site.

Figure 2:
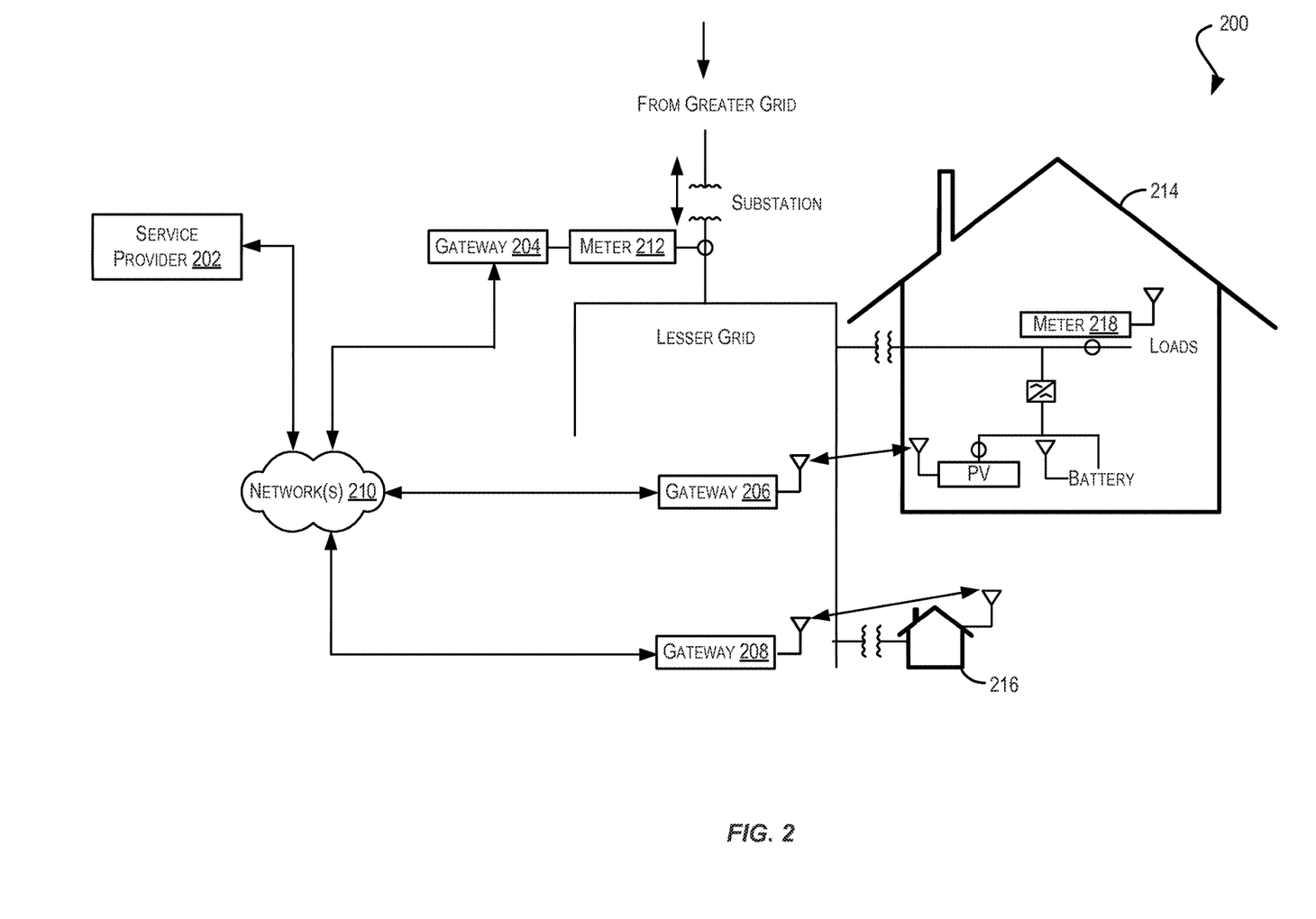
FIG. 2 is another simplified block diagram illustrating at least some features associated with controlling a distributed generation management system as described herein, according to at least one example.

FIG. 2 illustrates example environment 200 for implementing additional features of the present disclosure. In example environment 200, service provider 202 may be connected to one or more gateway devices 204, 206, 208 via one or more networks 210. Networks 210 may include any one or a combination of many different types of networks, such as cable networks, the Internet, wireless networks, powerline networks, cellular networks, satellite networks, other private and/or public networks, or any combination thereof.

Similar to as described with respect to FIG. 1, meter 212 may be installed or connected to a power line that feeds power from a greater grid (e.g., the utility service provider or the like) to a lesser grid such as, but not limited to, a neighborhood, a set of homes, a set of business, a set of devices within a building, etc. (e.g., through a substation or transformer). While meter 212 is shown just after the substation here (indicating a specific type of segment potentially predefined by the utility service provider), other such meters may be placed anywhere along the greater grid as well as anywhere within the lesser grid, and service provider 202 may be configured to collect power flow through that point and to control devices within a subset from that point. In other words, service provider 202 may define a segment that it intends to manage or control based at least in part on the location of this meter. While other meters may exist within the system, at least one meter (here, meter 212) should be the parent meter. Service provider 202 can then control the power at that parent meter by providing instructions to power generation devices that are effectively children nodes from that parent meter (e.g., within the segment that feeds from that parent meter).

In some examples, the power line may carry power from the substation, though meter 212, and then to subsequent sites (e.g., homes, business, public places, etc.) 214, 216 within the lesser grid (segment) intended to be controlled by the service provider. In some examples, meter 212 may be connected to gateway device 204 configured to communicate power information from meter 212 to service provider 202 via networks 210. This gateway 204 may act as a master gateway that provides all information to service provider 202, or it may serve merely to transmit information collected by meter 212. In some embodiments, however, gateway 204 may actually provide information collected by meter 212 to a different master gateway located somewhere else and that is accessible by networks 210. Meter 212 may be configured to measure and report power input and output information at its location. In this example, meter 212 is measuring power traveling in and out of the greater grid to the lesser grid.

As noted, the lesser grid (segment under control in this example) may include sites 214, 216, and/or one or more other sites connectible on the power line from the substation. These sites 214, 216 may be configured with one or more assets and/or loads. Assets may include PV systems or other power generation systems and/or battery systems or other energy storage systems. A load may be any power-consuming item such as, but not limited to, consumer devices (e.g., electronics, small appliances, etc.), home appliances, electric vehicle charging stations, and/or battery systems or other energy storage systems. In some examples, each of the loads may have a meter, such as meter 218, with an antenna for communicating with one or more gateway devices, such as gateway 206. Similarly, each of the battery storage devices and/or PV systems may have an antenna for communicating with one or more gateway devices, such as gateway 206. As noted, a master gateway (here, gateway 206) may manage communication between one or more devices within a region or location (here, within site 214) and route those communications to either a higher-level master gateway that communicates with service provider 202 or may route those communications directly to service provider 202. As desired, any number of gateways may be used, at various locations and/or distances, depending on the types of network connections, bandwidth concerns, antenna and/or signal strength, distance between devices, and/or gateway ranges.

As such, and potentially independently of the configuration of the gateways, each asset and/or load within a site may be able to provide power information to service provider 202 and receive control signals for managing power from service provider 202. It may also be possible, for site 216 to have a single antenna and communicate with a single gateway 208 for communicating individual asset and/or load power information. For example, the information may be in a table or other data structure and may include individual asset and/or load information with device identifiers or the like. The device identifiers may be used by service provider 202 to attribute power information to appropriate devices within site 216, even when the assets themselves are not reporting directly. Alternatively, in some examples, Ethernet or other network cabling (e.g., using standard routers, Internet service providers, or the like), cellular network technologies, and/or powerline carrier technology with one or more receivers (e.g., sending and receiving the data through the copper wire used to transmit the power) could be used to communicate the power information to service provider 202.

In some examples, service provider 202 may be configured to receive the power information from individual assets and/or loads of a single site (e.g., site 214), and also from individual assets and/or loads of other sites (e.g., site 216) within the lesser grid or within any defined region or sub-region of the greater grid. As such, multiple different sites 214, 216, etc., may be managed together in real-time to control the net power flow within that defined region. In some cases, service provider 202 may calculate a power profile for the defined region (here, the lesser grid) that will satisfy real-time power generation requirements or real-time power goals for the region under control. The power profile may be calculated based on a magnitude of power goal for the defined region. In this case, only a sufficient number of sites 214, 216 must be controlled that it will be possible to attain the goal. For example, if the goal is curtail power generation by 2% of the total net for the region, service provider 202 should at least have control of enough assets that dropping the total output of the controlled assets would affect the net by 2% or more. Of course, any percentage or number of devices under control of service provider 202 that will allow service provider 202 to affect the net power profile enough to reach the goal will suffice. As such, the number or percentage of sufficient devices may change over time as the goals and/or requirements change, and as the number of devices under control of service provider 202 change.

In some examples, the target power profile for the region under control may be fixed, it may be a value that changes over time, it may be dynamic (e.g., based at least in part on real-time factors), or it may be based on a control signal provided by a utility service provider (e.g., that controls the greater grid). For example, the utility provider may have upstream information that tells them how much power can be flowing at any time, and they may want to set the profile based on that information (which may be arbitrary from the perspective of service provider 202). The power profile could be fixed at zero (0), indicating that the defined region under control by service provider 202 can never export power to the greater grid. The power profile could be set at some fixed number that indicates an amount of power import (or export) that must at least occur at all times from (or to) the greater grid. In some examples, a control signal may be received from a utility provider that indicates how much power a system should output, where the system in this case would be the region under control of service provider 202 (i.e., the lesser grid of FIG. 2). In some cases, the power profile could be a single static set point (e.g., a particular invertor should be set to a power point of 5 kilowatts), it could be a time-varying profile, or it could be based on some locally measured value (e.g., Voltage). Further, control signals may vary, depending on the assets being controlled and/or the granularity of the control (e.g., whether an asset or an entire site with various assets is being controlled), such that a control signal may provide specific instructions for kilowatt output, voltage readings, amounts of storage, or it may provide percentage and direction of control (e.g., increase by 10%, decrease by 25%, etc.).

Figure 3:
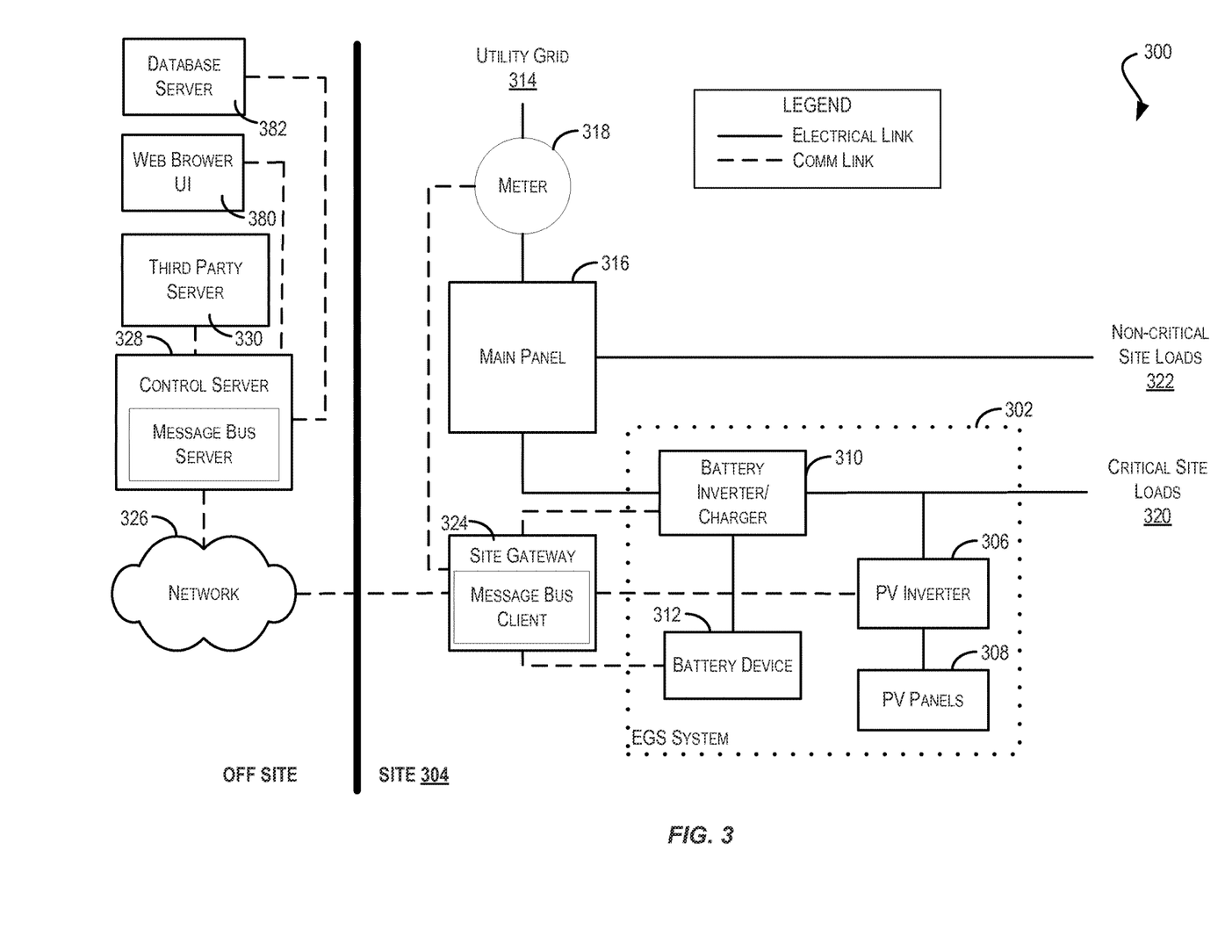
FIG. 3 is another simplified block diagram illustrating at least some additional features associated with controlling a distributed generation management system as described herein, according to at least one example.

FIG. 3 is a simplified block diagram of system environment 300 according to an embodiment of the present disclosure. As shown, system environment 300 includes an energy generation and storage (EGS) system 302 that is installed at site 304 (e.g., a residence, a commercial building, etc.). The EGS system 302 may include a PV-based energy generation subsystem comprising a PV inverter 306 and one or more PV panels 308, as well as a battery-based energy storage subsystem comprising battery inverter/charger 310 and/or battery device 312. In some embodiments, PV inverter 306 and battery inverter/charger 310 can be combined into a single device. In the example of FIG. 3, EGS system 302 may be grid-connected; thus, PV inverter 306 and battery inverter/charger 310 may be electrically connected to the utility grid (greater grid), for example, via main panel 316 and utility meter 318. Further, to provide power to site 304, utility grid 314, PV inverter 306, and/or battery inverter/charger 310 may be electrically connected to critical site loads 320 and/or non-critical site loads 322.

In some examples, integrated EGS systems such as system 302 may provide a number of advantages over energy generation systems that do not incorporate any on-site energy storage. For example, excess energy produced by PV components 306 and 308 can be stored in battery device 312 via battery inverter/charger 310 as a critical reserve. Battery inverter/charger 310 can then discharge this reserved energy from battery device 312 when utility grid 314 is unavailable (e.g., during a grid blackout) to provide backup power for critical site loads 320 until grid power is restored. As another example, battery device 312 can be leveraged to "time shift" energy usage at site 304 in a way that provides economic value to the site owner or the installer/service provider of the EGS system 302. For instance, battery inverter/charger 310 can charge the battery device 312 with energy from utility grid 314 (and/or PV inverter 306) when grid energy cost is low. Battery inverter/charger 310 can then dispatch the stored energy at a later time to, e.g., offset site energy usage from utility grid 314 when PV energy production is low/grid energy cost is high, or sell back the energy to the utility when energy buyback prices are high (e.g., during peak demand times).

In some examples, system environment 300 can include site gateway 324 and control server 328. Site gateway 324 may be a computing device (e.g., a general purpose personal computer, a dedicated device, etc.) that is installed at site 304. As shown, site gateway 324 may be communicatively coupled with on-site components 306, 310, 312, and 318, as well as with control server 328 via network 326. In one embodiment, site gateway 324 can be a standalone device that is separate from EGS system 302. In other embodiments, site gateway 324 can be embedded or integrated into one or more components of the system 302. Control server 328 may be a server computer (or a cluster/farm of server computers) that is remote from site 304. Control server 328 may be operated by, e.g., the installer or service provider of EGS system 302, a utility company, or some other entity.

In one embodiment, site gateway 324 and control server 328 can carry out various tasks for monitoring the performance of EGS system 302. For example, site gateway 324 can collect system operating statistics, such as the amount of PV energy produced (via PV inverter 306), the energy flow to and from utility grid 314 (via utility meter 318), the amount of energy stored in battery device 312, and so on. Site gateway 324 can then send this data to control server 328 for long-term logging and system performance analysis.

More significantly, site gateway 324 and control server 328 can operate in tandem to actively facilitate the deployment and control of EGS system 302. Specifically, FIG. 3 shows other entities remote from the site (OFF SITE) that may communicate with EGS system 302. These other entities may include web server 380 and database server 382.

It should be appreciated that system environment 300 is illustrative and not intended to limit embodiments of the present disclosure. For instance, although FIG. 3 depicts control server 328 as being connected with a single EGS system (302) at a single site (304), server 328 can be simultaneously connected with a fleet of EGS systems that are distributed at multiple sites. In these embodiments, control server 328 can coordinate the scheduling of these various systems/sites to meet specific goals or objectives. In further embodiments, the various components depicted in system 300 can have other capabilities or include other subcomponents that are not specifically described. Furthermore, multiple instances and variants of the control server may exist, each communicating with one or more other control servers, EGS systems and/or other devices connected to EGS system 304. One of ordinary skill in the art will recognize many variations, modifications, and alternatives.

Figure 4:
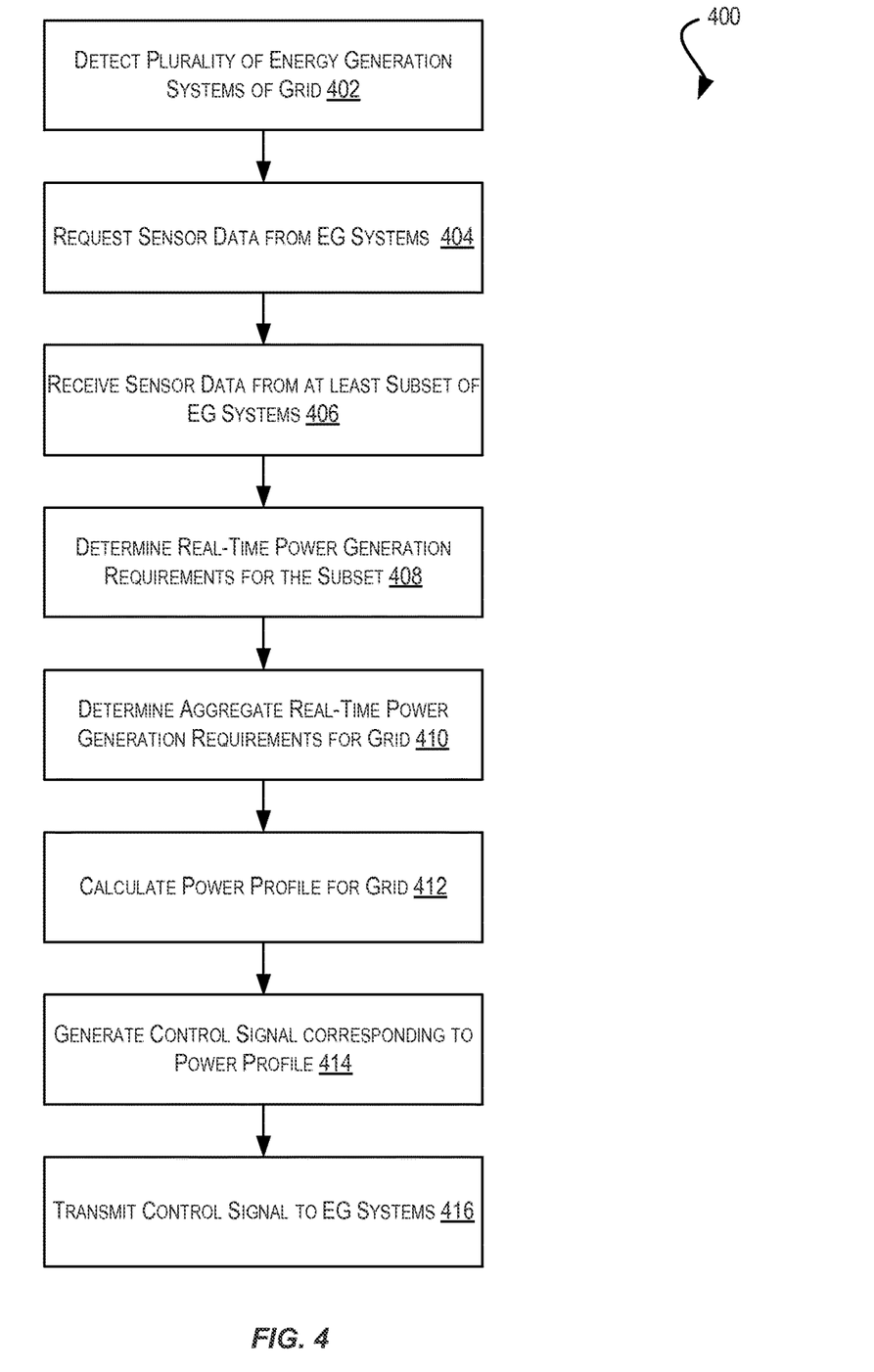
FIG. 4 is a simplified flow diagram illustrating at least one method for controlling a distributed generation management system as described herein, according to at least one example.
Figure 5:
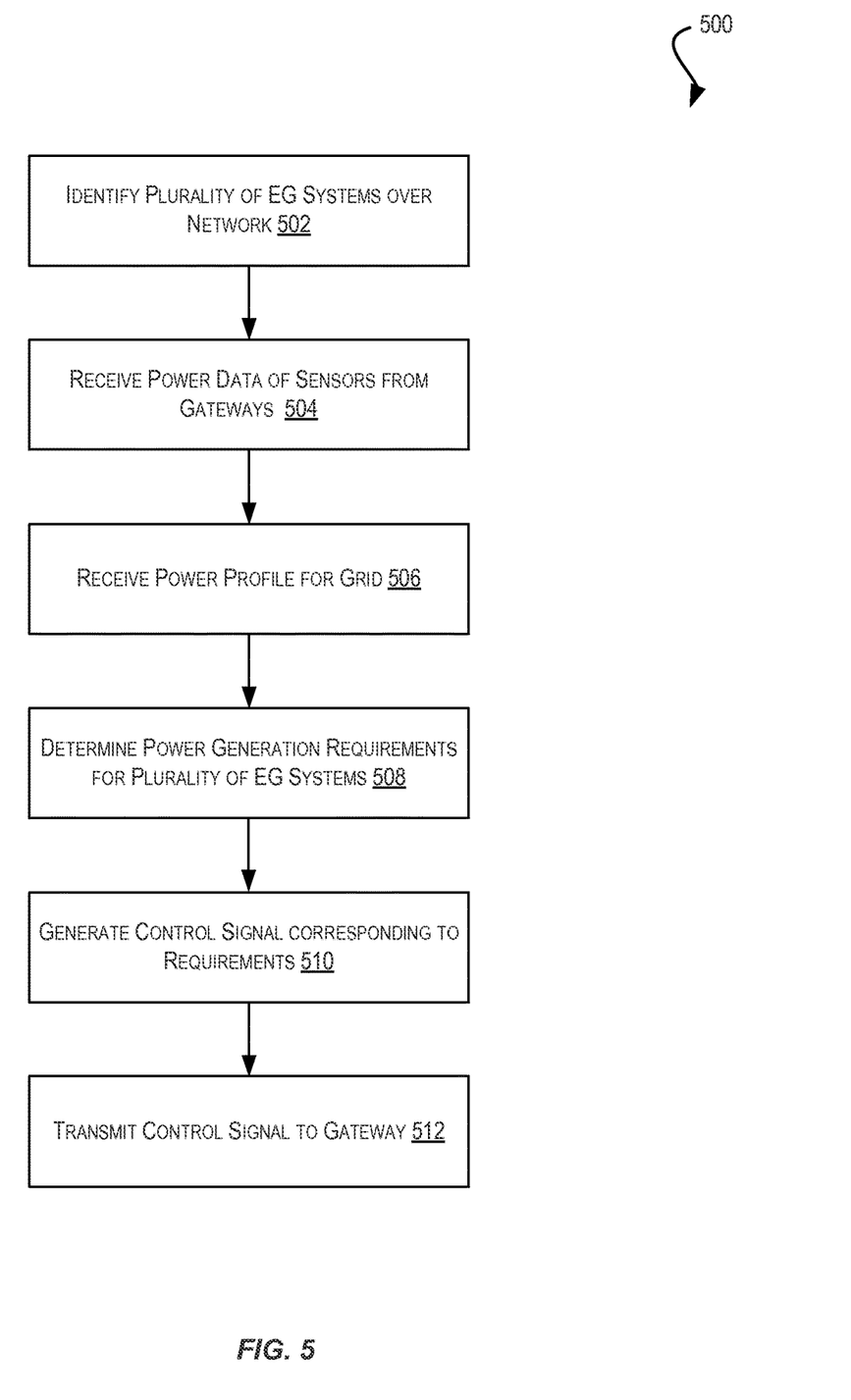
FIG. 5 is another simplified flow diagram illustrating at least one method for controlling a distributed generation management system as described herein, according to at least one example.

FIGS. 4 and 5 illustrate example flow diagrams showing respective processes 400 and 500 for controlling a distributed generation management system, as described herein. These processes 400, 500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, one or more processors of control server 102 of FIG. 1 or service provider 202 of FIG. 2 may perform method 400 of FIG. 4. Method 400 may begin at 402, where a plurality of energy generation (EG) systems may be detected over a network (e.g., a wireless network). The detection may be performed by a server or by one or more gateway devices in communication with the server and the EG systems. In some examples, the EG systems may form a grid (e.g., the lesser grid described with reference to FIGS. 1 and 2. Additionally, the network may include or utilize a message bus system configured to communicate sensor data and/or control signals. At 404, sensor data may be requested from the plurality of EG systems. The sensor data may include real-time power generation data for the EG systems. For example, the sensor data may include data collected by sensors of one or more power generation assets (e.g., PV systems or the like) at a site, or it may include overall power generation data for the site. The sensor data may include asset data that identifies one or more assets of the lesser grid. At 406, sensor data may be received (e.g., through one or more gateway devices) from at least a subset of the EG systems. In some cases, not all of the EG systems on the grid (or lesser grid) may be controllable or not all of them may be operational. Similarly, some of the EG systems may not be registered with the control server. In any event, at least some of the EG systems may respond to the request from 404 with sensor data. At 408, real-time power generation requirements may be determined for the subset of EG systems (e.g., the responding EG systems). The real-time power generation requirements for the subset may be determined based at least in part on the received sensor data. At 410, aggregate real-time power generation requirements for the grid (e.g., the lesser grid or the segment of the grid that is being controlled/managed) may be determined. In some cases, the aggregate real-time power generation requirements for the grid may be determined based at least in part on the determined requirements for the subset of EG systems.

At 412, a power profile for the grid (lesser) may be calculated. In some examples, the power profile may be based at least in part on aggregate real-time power generation requirements for the grid. In some examples, the power profile may be based at least in part on a control signal received from the utility provider that manages the greater grid. In some embodiments, the power profile may be calculated based at least in part on a combination of the aggregate data determined for the grid and the control signal received from the utility provider. The power profile may be an arbitrary value, a value that changes over time, a raw property (e.g., voltage), or a percentage or range of increase or decrease. The power profile may also be calculated to reconcile the aggregate real-time power generation requirement for the grid. In other words, the power profile may be created in order to make sure the aggregate requirement (which may be based on a control signal from the utility) is within the lesser grid. Further, the power profile may be created in order to reconcile the real-time power generation requirements for the grid network (e.g., the lesser grid) and each EG system. At 414, one or more control signals for controlling power generation of the EG systems on the grid may be generated. The control signals may correspond to the calculated power profile and may also be based at least in part on the received sensor data from the responding EG systems. For example, if an EG system reported (via its sensor data) that it was generating a certain amount of power, the control signal generated at 414 may take that value into consideration when determining how much power to continue generating. The control signals may provide instructions for particular assets within the lesser grid. In some examples, method 400 may end at 416, where the control signal may be transmitted to the subset of EG systems in the lesser grid or segment under control.

FIG. 5 illustrates an example flow diagram showing method 500 for controlling a distributed generation management system, as described herein. The one or more processors of control server 102 of FIG. 1 or service provider 202 of FIG. 2 may perform method 500 of FIG. 5. Method 500 may begin at 502 by identifying a plurality of EG systems over a network. At 504, power data of sensors located at or within the plurality of EG systems may be received from one or more gateway devices. In some examples, at 506, a power profile for the grid (e.g., the lesser grid or at least a grid that includes the EG systems under control) may be received. The power profile for the grid may be received from a utility provider. At 508, power generation requirements for the identified EG systems may be determined based at least in part on the power profile for the grid and the power data received from the gateways. At 510, a control signal that corresponds to the determined requirements may be generated. In some examples, method 500 may end at 512, where the control signals may be transmitted to the gateway devices. Individual assets of the EG systems or the EG systems as individual units (e.g., that then locally manage their own assets) can receive the control signals from the gateway devices.

Figure 6:
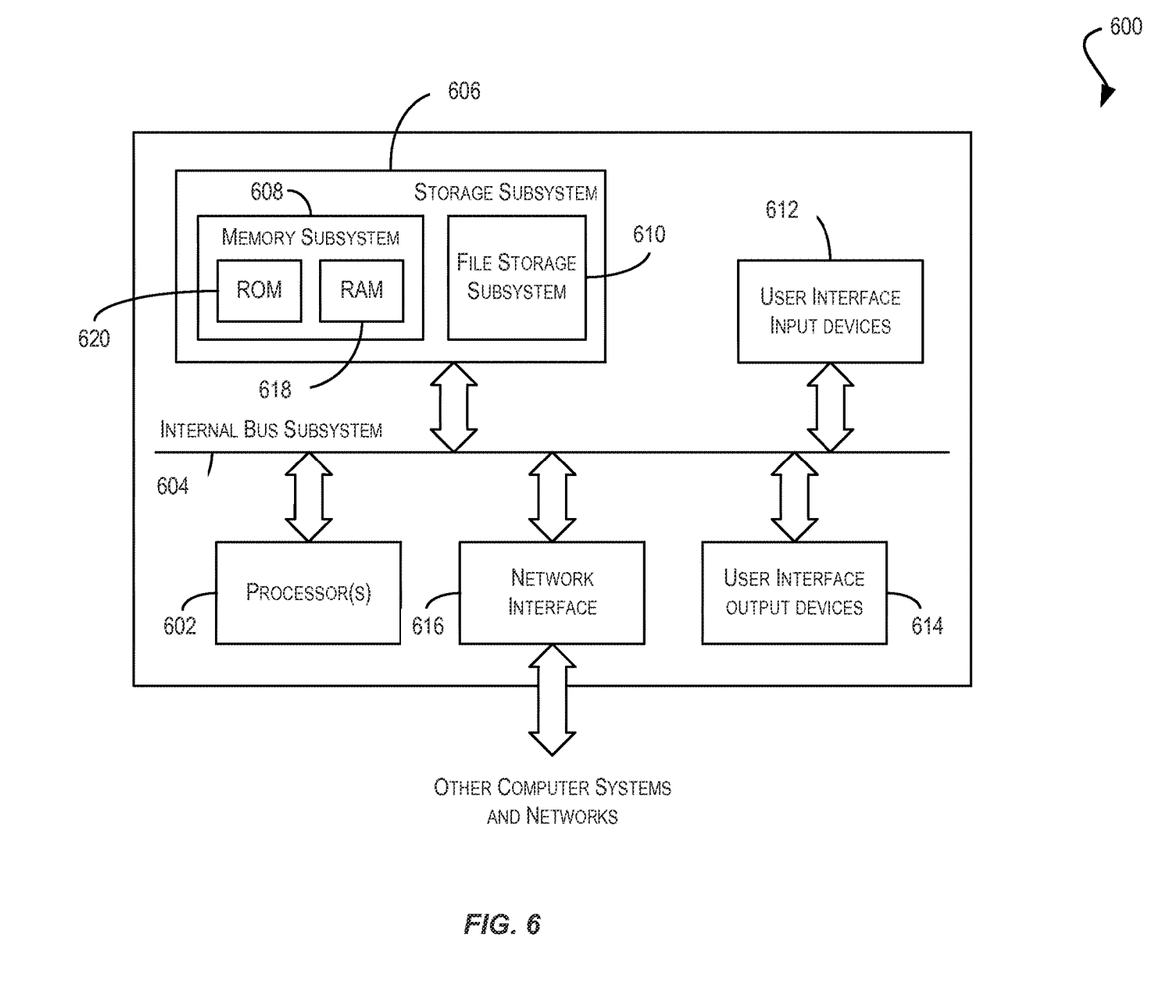
FIG. 6 depicts a simplified block diagram of a computing system for implementing some of the examples described herein, according to at least one example.

FIG. 6 is a simplified block diagram of computer system 600 according to an embodiment of the present disclosure. Computer system 600 can be used to implement any of the computer systems/devices (e.g., control server 102, service provider 202, gateway devices 204, 206, 208) described with respect to FIGS. 1-3. As shown in FIG. 6, computer system 600 can include one or more processors 602 that communicate with a number of peripheral devices via bus subsystem 604. These peripheral devices can include storage subsystem 606 (comprising memory subsystem 608 and file storage subsystem 610), user interface input devices 612, user interface output devices 614, and network interface subsystem 616.

In some examples, internal bus subsystem 604 can provide a mechanism for letting the various components and subsystems of computer system 600 communicate with each other as intended. Although internal bus subsystem 604 is shown schematically as a single bus, alternative embodiments of the bus subsystem can utilize multiple buses. Additionally, network interface subsystem 616 can serve as an interface for communicating data between computer system 600 and other computer systems or networks (e.g., the Internet of FIG. 1 and/or network 210 of FIG. 2). Embodiments of network interface subsystem 616 can include wired interfaces (e.g., Ethernet, CAN, RS232, RS485, etc.) or wireless interfaces (e.g., ZigBee, Wi-Fi, cellular, etc.).

In some cases, user interface input devices 612 can include a keyboard, a pointing device (e.g., mouse, trackball, touchpad, etc.), a barcode scanner, a touch-screen incorporated into a display, an audio input device (e.g., voice recognition systems, microphones, etc.), and other types of input devices. In general, use of the term "input device" is intended to include all possible types of devices and mechanisms for inputting information into computer system 600. Additionally, user interface output devices 614 can include a display subsystem, a printer, or non-visual displays such as audio output devices, etc. The display subsystem can be any known type of display device. In general, use of the term "output device" is intended to include all possible types of devices and mechanisms for outputting information from computer system 600.

Storage subsystem 606 can include memory subsystem 608 and file/disk storage subsystem 610. Subsystems 608 and 610 represent non-transitory computer-readable storage media that can store program code and/or data that provide the functionality of embodiments of the present disclosure. In some embodiments, memory subsystem 608 can include a number of memories including a main random access memory (RAM) 618 for storage of instructions and data during program execution and a read-only memory (ROM) 620 in which fixed instructions may be stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and not intended to limit embodiments of the present disclosure. Many other configurations having more or fewer components than system 600 are possible.

Illustrative methods and systems for managing EGS systems are described above. Some or all of these systems and methods may, but need not, be implemented at least partially by architectures such as those shown at least in FIGS. 1-6 above. While many of the embodiments are described above with reference to power generation systems, it should be understood that any type of electronic asset may be managed using these techniques. For example, any electronic device and/or appliance (e.g., a gas range) within a site that is has network connection capabilities may be configured to interact with the distributed management system. As such, any device (e.g., an air conditioning unit, a furnace, a refrigerator, a phone charger, etc.) may be able to provide real-time performance information to the distributed management system described above, and the distributed management system may be able to generate a power profile for individual devices and/or collections of devices. Further, the distributed management system may then be configured to provide signals for controlling these devices (e.g., to turn on, turn off, change temperature or other setting, etc.) based at least in part on the power profile and/or the real-time performance information. In the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices, which can be used to operate any of a number of applications. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and Zigbee. The network can be, for example, a local area network, a wide-area network, a virtual private network, the Internet, an intranet, an extranet, a public switched telephone network, an infrared network, a wireless network, and any combination thereof.

In embodiments utilizing a network server, the control server can run any of a variety of server or mid-tier applications, including HTTP servers, FTP servers, CGI servers, data servers, Java servers, and business application servers. The control server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for controlling, by a computing system configured with a message bus server, a plurality of photovoltaic systems, comprising:
    detecting the plurality of photovoltaic systems over a network, the plurality of photovoltaic systems forming a grid network, the network comprising a message bus system configured to communicate, via the message bus server, messages between the plurality of photovoltaic systems and the message bus server by communicating with at least one message bus client of the plurality of photovoltaic systems;
    requesting sensor data from the plurality of photovoltaic systems of the grid network, the sensor data including real-time power generation data for solar cells of the plurality of photovoltaic systems;
    receiving, by the message bus server and via the message bus system of the network, a first message comprising the sensor data from at least a subset of the plurality of photovoltaic systems;

determining real-time power generation requirements for at least the subset of the plurality of photovoltaic systems based at least in part on the sensor data;

determining an aggregate real-time power generation requirement for the grid network based at least in part on the real-time power generation requirements for at least the subset of the plurality of photovoltaic systems;

calculating a power profile for the grid network that identifies an amount of power to be generated by at least the subset of the plurality of photovoltaic systems, the power profile calculated based at least in part on the aggregate real-time power generation requirement;

dynamically updating the power profile based at least in part on real-time changes to the aggregate real-time power generation requirement;

generating a control signal to time shift release of a portion of the power generated by at least the subset of the plurality of photovoltaic systems of the grid network in accordance with the dynamically updated power profile, the control signal including instructions for changing settings of one or more of the photovoltaic systems of the plurality of photovoltaic systems; and transmitting, from the message bus server of the message bus system of the network, a second message comprising the control signal to the at least one message bus client of the one or more of the plurality of photovoltaic systems of the grid network.

2. The method of claim 1, wherein the power profile is calculated to reconcile the aggregate real-time power generation requirement for the grid network.

3. The method of claim 1, wherein the message bus server is managed by a service provider responsible for controlling multiple nodes of a utility grid to which the plurality of photovoltaic systems are attached.

4. The method of claim 1, wherein the sensor data includes asset data that identifies one or more assets of the grid network, wherein the one or more assets of the grid network are configured to manage real-time power generation of at least one of the plurality of photovoltaic systems, and wherein the control signal is configured to control the one or more assets of the grid network.

5. The method of claim 1, wherein time-shifting release of the portion of the power generated by at least the subset of the plurality of photovoltaic systems is performed to prevent an amount of power being released into the grid network from exceeding a predetermined threshold.

6. The method of claim 1, wherein the control signal includes instructions for one or more energy storage systems associated with respective ones of the plurality of photovoltaic systems to store power provided by the grid network to reduce an amount of power on the grid network.

7. A computer system, comprising a message bus server and with a processor configured to execute computer-executable instructions, stored in a memory of the computer system, to:

identify a plurality of photovoltaic systems over a network, the plurality of photovoltaic systems forming a grid network, the network comprising a message bus system configured to communicate, via the message bus server, messages between the plurality of photovoltaic systems and the message bus server by communicating with at least one message bus client of the plurality of photovoltaic systems;

receive, by the message bus server and via the message bus system of the network, a first message comprising power generation data for solar cells of the plurality of photovoltaic systems from each sensor of at least a subset of the plurality of photovoltaic systems of the grid network;

determine an aggregate real-time power requirement for the grid network based at least in part on the power data;

calculate a power profile for the grid network that identifies an amount of power to be generated by one or more of the plurality of photovoltaic systems, the power profile calculated based at least in part on the aggregate real-time power requirement;

dynamically updating the power profile based at least in part on real-time changes to the aggregate real-time power generation requirement;

generate a control signal to time shift release of a portion of the power generated by the subset of the plurality of photovoltaic systems into the grid network in accordance with the dynamically updated power profile, the control signal including instructions for changing settings of one or more of the photovoltaic systems of the plurality of photovoltaic systems; and transmit, from the message bus server of the message bus system of the network, a second message comprising the control signal to the at least one message bus client of the one or more of the plurality of photovoltaic systems of the grid network.

8. The computer system of claim 7, wherein the processor is further configured to execute the computer-executable instructions to request the power data from each sensor at least in response to identifying the plurality of photovoltaic systems.

9. The computer system of claim 7, wherein one or more photovoltaic systems of the subset of the plurality of photovoltaic systems are positioned within residential dwellings.

10. The computer system of claim 9, wherein the message bus server is managed by a service provider responsible for controlling multiple nodes of a utility grid to which the plurality of photovoltaic systems are attached.

11. The computer system of claim 7, wherein the processor is further configured to execute the computer-executable instructions to:

request asset data from the plurality of photovoltaic systems, wherein the asset data identifies one or more assets in the plurality of photovoltaic systems; and receive the asset data from the plurality of photovoltaic systems, wherein the control signal is configured to control the one or more assets in the plurality of photovoltaic systems.

12. The computer system of claim 11, wherein the one or more assets are configured to control real-time power generation of the plurality of photovoltaic systems.

13. The computer system of claim 11, wherein at least one of the one or more assets comprises a photovoltaic inverter.

14. The computer system of claim 7, wherein the power data is received from a gateway device that collects the power data from at least the subset of the plurality of photovoltaic systems.

15. The computer system of claim 14, wherein the gateway device is configured to receive the power data via the network and wherein the network is a wireless network.

16. The computer system of claim 14, wherein the gateway device is configured to receive the power data from at least one of a meter coupled to an asset of at least one photovoltaic system of the subset of the plurality of photovoltaic systems, the one photovoltaic system of the subset of the plurality of photovoltaic systems, a set of photovoltaic systems of the subset of the plurality of photovoltaic systems, or a secondary gateway.

17. A non-transitory computer-readable storage medium configured to store computer-readable instructions that, when executed by one or more processors of a computer system configured with a message bus server, configure the one or more processors to perform operations comprising:

identifying a plurality of photovoltaic systems over a network, the plurality of photovoltaic systems forming a grid network, the network comprising a message bus system configured to communicate, via the message bus server, messages between the plurality of photovoltaic systems and the message bus server by communicating with at least one message bus client of the plurality of photovoltaic systems;

receiving, by the message bus server and via the message bus system of the network, a first message comprising sensor data from at least a subset of the plurality of photovoltaic systems, the sensor data including real-time power generation data for solar cells of the plurality of photovoltaic systems;

determining real-time power generation requirements for at least the subset of the plurality of photovoltaic systems based at least in part on the sensor data;

determining an aggregate real-time power generation requirement for the grid network based at least in part on the real-time power generation requirements for at least the subset of the plurality of photovoltaic systems;

calculating a power profile for the grid network that identifies an amount of power to be generated by at least the subset of the plurality of photovoltaic systems, the power profile calculated based at least in part on the aggregate real-time power generation requirement;

dynamically updating the power profile based at least in part on real-time changes to the aggregate real-time power generation requirement; and providing, to at least the subset of the plurality of photovoltaic systems from the message bus server of the message bus system of the network, a second message comprising a control signal to the at least one message client of one or more of the plurality of photovoltaic systems of the grid network to time shift release of a portion of the power generated by at least the subset of the plurality of photovoltaic systems into the grid network in accordance with the dynamically updated power profile, the control signal including instructions for changing settings of one or more of the photovoltaic systems of the plurality of photovoltaic systems.

18. The non-transitory computer-readable storage medium of claim 17, wherein the power profile is dynamically updated to continuously ensure maintenance of the aggregated real-time power generation requirement for the grid network.

19. The non-transitory computer-readable storage medium of claim 17, wherein the sensor data includes asset data that identifies one or more assets of the grid network, wherein the one or more assets of the grid network are configured to manage real-time power generation of at least one of the plurality of photovoltaic systems, and wherein the control signal is configured to control the one or more assets of the grid network.

20. The non-transitory computer-readable storage medium of claim 17, wherein time shifting release of the portion of the power generated by at least the subset of the plurality of photovoltaic systems is performed to prevent an amount of power being released into the grid network from exceeding a predetermined threshold.

\* \* \* \* \*